United States Patent [19]

Kudo

[11] Patent Number: 4,487,349
[45] Date of Patent: Dec. 11, 1984

[54] ROOF-TOP CARRIER MOUNTING APPARATUS FOR VEHICLE

[75] Inventor: Hirokatsu Kudo, Saitama, Japan

[73] Assignee: Honda Giken Kogyo Kabushiki Kaisha, Tokyo, Japan

[21] Appl. No.: 546,505

[22] Filed: Oct. 28, 1983

[30] Foreign Application Priority Data

Oct. 28, 1982 [JP] Japan .............................. 57-164499[U]

[51] Int. Cl.³ .............................................. B60R 9/04
[52] U.S. Cl. ..................................... 224/322; 224/917
[58] Field of Search ............... 224/309, 317, 321, 322, 224/325, 326, 327, 329, 330, 331, 917, 324; 414/462; 296/208, 3; 280/769

[56] References Cited

U.S. PATENT DOCUMENTS

| | | | |
|---|---|---|---|
| 3,711,147 | 1/1973 | Higuchi et al. | 296/208 |
| 4,222,508 | 9/1980 | Bott | 224/324 |
| 4,244,501 | 1/1981 | Ingram | 224/324 |
| 4,264,025 | 4/1981 | Ferguson et al. | 224/321 |
| 4,323,182 | 4/1982 | Bott | 224/321 |

Primary Examiner—Stephen Marcus
Assistant Examiner—David Voorhees
Attorney, Agent, or Firm—Lyon & Lyon

[57] ABSTRACT

A ski carrier mounting apparatus for a vehicle with longitudinal slots in the roof, otherwise known as a "Mohecan" type roof. The mounting device utilizes the substantially trapezoidal cross-sectional shape of the slots and consists of two independent members which may be connected to provide a rigid base on which the ski carrier may be mounted.

9 Claims, 6 Drawing Figures

ROOF-TOP CARRIER MOUNTING APPARATUS FOR VEHICLE

The present invention relates to a rooftop carrier mounting apparatus suitable for use on vehicles with a "Mohecan" type body panel and, in particular, to a ski carrier. In recent years, skiing has been in great vogue and passenger cars or the like have been widely used to go to ski areas. When going to a ski area in such a vehicle, it is necessary to transport ski equipment such as skis and poles. It is particularly difficult to transport a pair of skis because they are usually quite long. It is known that a means called a ski carrier is generally employed to transport a pair of skis on such a vehicle. Similarly, surf boards and other recreational devices, as well as many other products, are of such a length as to be difficult or impossible to carry inside or in the trunk of a passenger vehicle. It is contemplated that the rooftop carrier of this invention will have its greatest use as a ski carrier and therefore it will be described as such but without limitation as to its scope of uses.

A typical conventional ski carrier is secured to the side edge portions of a vehicle roof by means of an apparatus with suction and clamping devices connected to the edge portions of the roof of the vehicle. An apparatus of this type, however, is difficult to assemble due to its complicated structure and it tends to detract from the appearance of the vehicle.

A vehicle which has longitudinal joints from joining the vehicle body side panels with the vehicle roof usually has upwardly opened slots formed on the upper side of the respective joints, such as the vehicle roof disclosed in U.S. Pat. No. 3,711,147. Such a vehicle is known in the industry as a vehicle having a "Mohecan" type roof.

As will be fully understood from the description, the object of this invention is to provide, especially for a vehicle having a "Mohecan" type roof, a roof-top carrier mounting apparatus for a vehicle which is simple to assemble and use as well as attractive in appearance. This is accomplished by using the upwardly open slots formed on the upper side of the joints on both sides of the roof of the vehicle which have a tapered shape, i.e., a shape having a substantially trapezoidal cross-section.

To this end, the invention provides a mounting apparatus in which, with respect to each of the slots having the above-mentioned configuration, a cotter member and a base member are utilized, the cotter member is of substantially trapezoidal cross-section and can be fitted into and removed from the slot through the overhead opening thereof, and a base member which is of substantially T-shaped cross-section, and the upper portion has sufficient width to cover the overhead slot opening, the projection is adapted to be inserted into the slot and abut against one side surface of the cotter member, and means to secure the cotter member to the base member. When the cotter member and the base member are assembled in one body, they are secured in the slot by utilizing the configurations and structures thereof. This results in a roof-top carrier with only few required parts, a simple method of mounting the carrier, a lower manufacturing costs, and which is more attractive than conventional roof-top carrier mounting devices.

The accompanying drawings in combination show an embodiment of the invention, in which.

Figure 1:
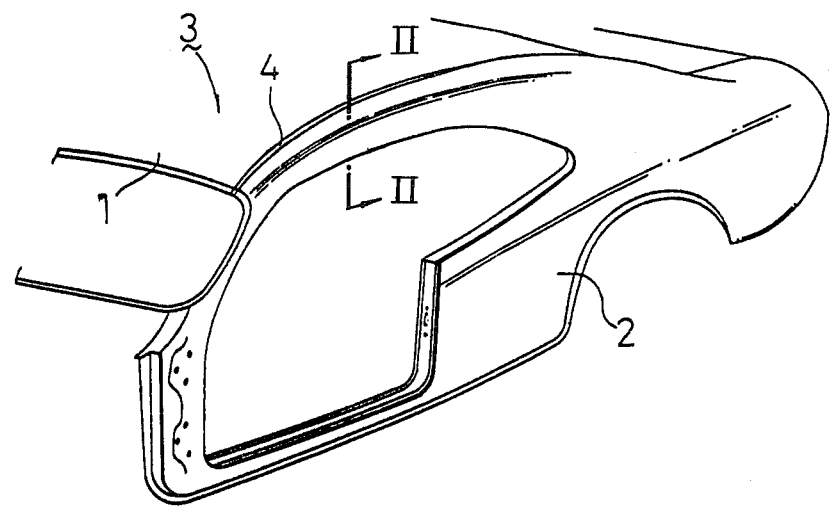
FIG. 1 is a perspective view of an essential part of a body panel of a "Mohecan" type vehicle.

A preferred embodiment of the invention will be described hereinunder in detail with reference to the accompanying drawings and to the embodiment of greatest anticipated use, i.e. a ski carrier. In FIG. 1, a roof panel 1 and a side panel 2 of a vehicle having a "Mohecan" type roof are joined in one body, resulting in a linear joint formed along the side of the roof 3 of the vehicle in the longitudinal direction thereof. Thus, a slot 4 is formed at the joint on the upper side thereof. Similarly, another slot (not shown in FIG. 1) identical to slot 4 is formed in a symmetrical position on the other side of the roof 3.

Figure 2:
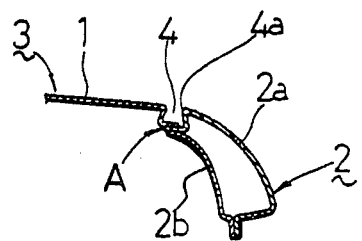
FIG. 2 is a sectional view taken along the line II—II of FIG. 1.

Referring to FIG. 2, it is to be noted that the side panel 2 is made up of an outer side panel 2a which is the automobile's exterior, and an inner side panel 2b which is on the interior compartment side of the automobile, and that the upper edges of the outer side panel 2a and the inner side panel 2b are joined with the side edge of the roof panel 1 in an overlapping fashion with each other by welding or the like to form a joint A.

The slot 4, in accordance with the invention, is formed to have a cross-section that is tapered upward by bending the side edge of the roof panel 1 into a substantially Z shape as well as bending the upper side edge of the outer side panel 2a into a substantially inverted Z shape. Although the cross-section of the slot is bent so as to be substantially trapezoidal in the illustrated embodiment, the shape is not limited thereto. The essential thing is that at least one of the side walls of the slot 4 is bent so that the cross-section of the slot 4 tapers toward the overhead opening 4a thereof.

Figure 3:
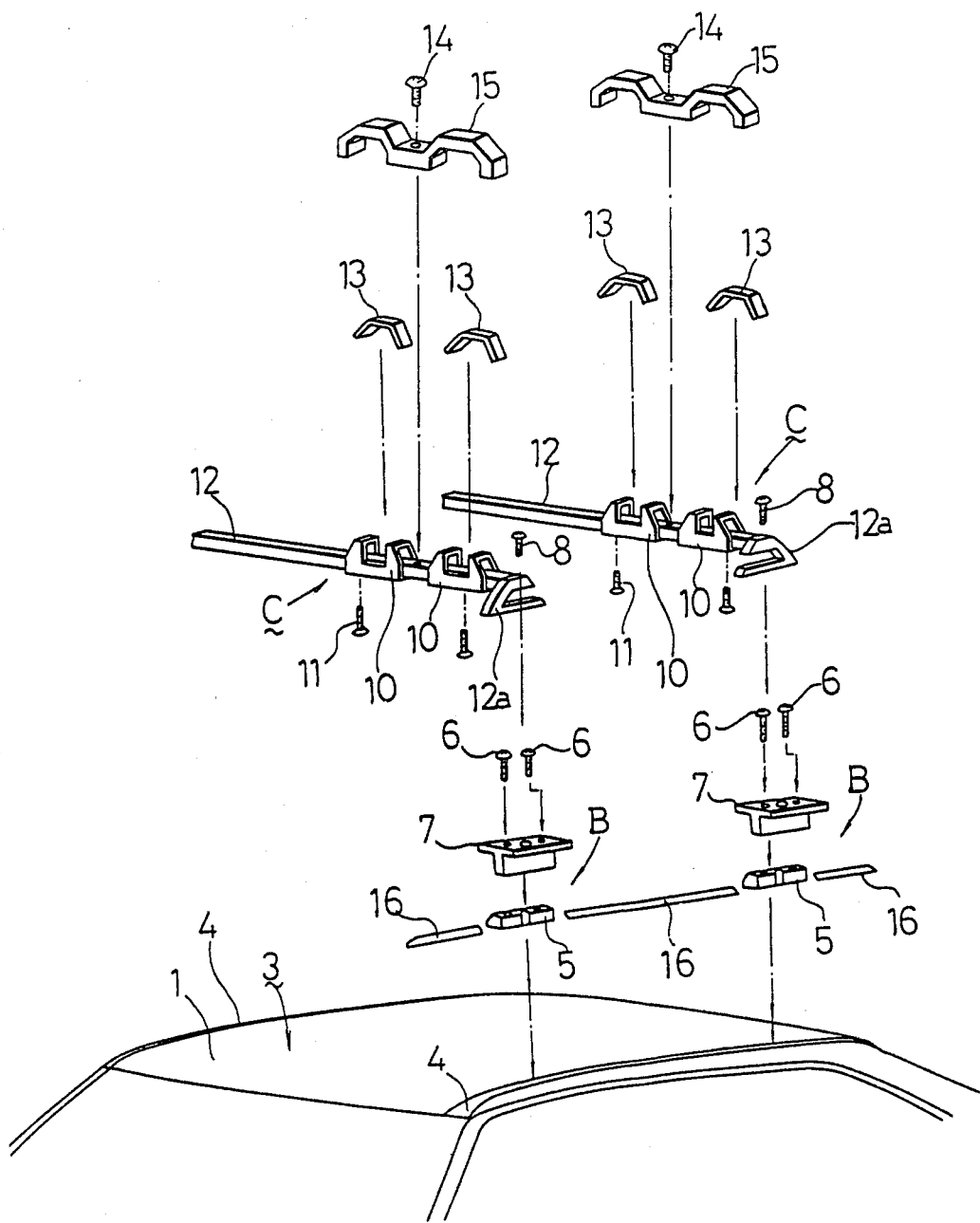
FIG. 3 is an exploded view of the entire ski carrier apparatus, for illustrating how the same is assembled.
Figure 4:
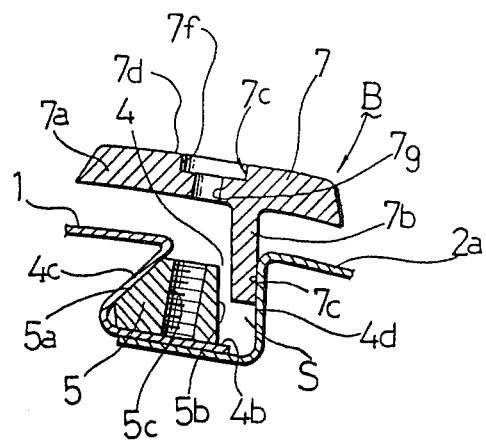
FIG. 4 is a sectional view of a mounting device, showing the construction thereof.
Figure 5:
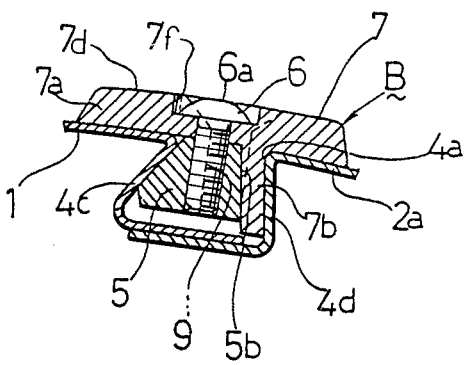
FIG. 5 is a sectional view of the mounting device, showing the state where the mounting device is assembled and secured in a slot.

A mounting device B for mounting a ski carrier consists of two members, a cotter member 5 and a base member 7, as shown in FIGS. 3, 4, and 5. The cotter member 5 is an elongated member of substantially trapezoidal cross-section and of a sufficiently narrow width to be inserted and removed from the overhead opening of a slot 4 having the aforementioned shape, and which has a side surface 5a parallel to the tapered side wall 4c of the slot 4 so that it may abut against the tapered side wall 4c. The other side surface 5b of the cotter member 5 is formed so as to be parallel to the other side wall 4b of the slot 4. In addition, the cotter member 5 has two screw holes 5c vertically bored and threaded at front and rear positions thereof for receiving screws 6.

The base member 7 is an elongated member having a substantially T-shaped cross-section which is constituted by a base body 7a having a width larger than that of the overhead opening of the slot 4a, and a projection 7b projecting downwardly from the base body 7a. The projection 7b is adapted to be inserted into the slot 4 from the overhead opening 4a between the side surface 5b of the cotter member 5 and the side wall 4b of the slot 4, and be parallel thereto. Such a base member 7 has through holes 7c vertically bored at front and rear positions such that the two through holes 7c vertically align with the two screw holes 5c in the cotter member 5, respectively, in assembly.

Each through hole 7c is comprised of two portions, each of a different diameter: the upper portion of the through hole 7c is made larger in diameter to form a countersunk hole 7f adapted to prevent the head 6a of the screw 6 from projecting above the upper surface of the base member 7d when the cotter member 5 and the base member 7 are screwed together. The lower side of the through hole 7c is made smaller in diameter to form a hole 7g to receive the screw 6.

According to the above-mentioned construction, the mounting device B for mounting the ski carrier C is assembled and fitted as follows. First of all, the cotter member 5 is inserted into the slot 4, as shown in FIG. 4, such that the inclined side 5a abuts the upwardly tapered wall 4c of the slot 4 with a space S between the other side of the cotter 5b and the side wall 4d of the slot 4. Thereafter, the base member 7 is positioned by inserting the projection 7b into the space S between the side of the cotter 5b and the side wall 4d of the slot 4 from the slot overhead opening 4a. In this state, the screws 6 are received by the through holes 7c and screwed into the screw holes 5c in the cotter member 5.

Figure 6:
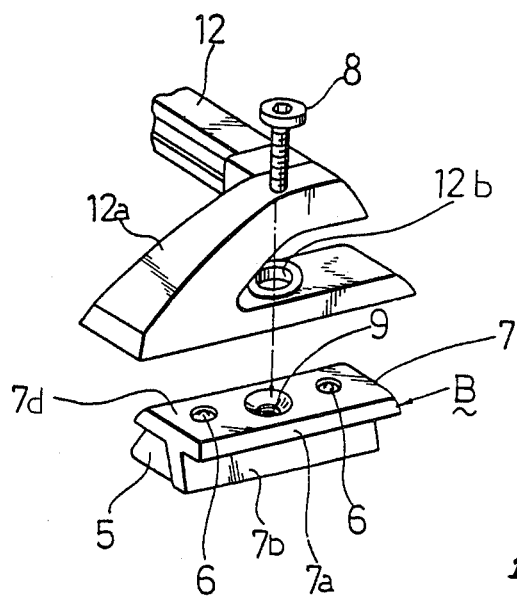
FIG. 6 is a perspective view showing how the mounting device and an end portion of a carrier bar are assembled together.

As the screws 6 are tightened, the cotter member 5 gradually rises along the tapered slot wall 4c. In the end, the mounting device B is assembled when, due to the rising of the cotter 5 towards the base 7a and its protusion 7b, the cotter member 5, the base member 7, and the slot walls 4c and 4d are all in resilient contact, as shown in FIG. 5. When assembled, the mounting device B is secured because the upper part of the projection 7b and the upper part of the cotter member 5 are formed so that the sum of their widths is slightly larger than the width of the opening 4a of the slot 4. Mounting devices B thus assembled are provided at two longitudinal positions in each slot 4. FIG. 6 is a perspective view of the assembled mounting device B separated from the roof for clarity of illustration. As will be obvious from FIG. 6, the mounting device B has in its central position a screw hole 9 for receiving a bolt 8 for securing the ski carrier C. The screw hole 9 is shown by a broken line in FIG. 5, and portions defining the screw hole 9 are formed in the cotter member 5 and the base member 7, respectively. The end portions 12a of the ski carrier bars 12 are secured with the bolts 8 screwed into the screw hole 9 through a hole 12b bored in each end portion 12a, thereby allowing one end of each carrier bar 12 to be mounted and screwed onto the upper surface 7d of the mounting device B. The other end portions of the respective carrier bars 12 are similarly secured to the corresponding mounting devices B on the other side of the automobile. It is to be noted that although a bolt 8 is employed for securing in the above-described embodiment, it is also possible to secure each mounting device by means of a band, a latch or the like by slightly modifying the configuration of the mounting devices B.

Ski supports 10 are attached to the ski carrier bars 12 by means of fasteners 11 such as screws. Moreover, each ski support 10 is provided with a securing cover 13 for holding the ski in place and a burglarproof cover 15 which is secured by a special bolt 14. Moldings 16 are placed in the portions of the slot 4 not occupied by the mounting devices B thereby covering the entire slot 4 and providing an excellent appearance.

I claim:

1. A mounting apparatus for a roof-top carrier with end pieces to mount to a vehicle roof which has slots formed longitudinal into said roof, said slots having an overhead opening of specified width, comprising, a cotter member having a width less than the width of the overhead slot opening, a base member having a portion whose width is less than the width of the overhead slot opening, means for connecting said members, the combined width of said connected members being greater than the width of the overhead opening of the slot, and means for attaching the roof-top carrier end pieces to said connected members.

2. The mounting apparatus as set forth in claim 1 where said cotter member has a cross section which is substantially trapezoidal, said base member having a cross section which is substantially T shaped.

3. The mounting apparatus as set forth in claim 2 for a ski carrier where the end pieces are connected to bars which run transverse to the direction of the slots, mounting brackets, slideably attached to said bars, said mounting brackets consisting of a solid piece with a transverse slot for holding skis, a securing member, and means to attach said securing member to said mounting bracket.

4. A mounting apparatus for a roof-top carrier with end pieces which mounts to a vehicle roof, the roof having slots formed in the longitudinal direction in said roof, the slots having an overhead opening of specified width and a cross section that tapers towards such overhead opening, comprising, an elongated cotter member whose width is less than that of the overhead slot opening, a base member, having upper and lower portions and whose cross section is substantially T shaped, the width of said upper portion being greater than the width of the overhead slot opening, and the width of said lower portion being less than the width of the overhead slot opening, and means to connect said members, the width of said connected members being greater than the width of the overhead slot opening, and means to connect said connected members to the roof-top rack end pieces.

5. A mounting apparatus as set forth in claim 4 wherein said cotter member has a substantially trapezoidal cross section.

6. The mounting apparatus as set forth in claim 5 for a ski carrier where the end pieces are connected to bars which run transverse to the direction of the slots, mounting brackets, slideably attached to said runners, said mounting brackets consisting of a solid piece with a transverse slot for holding skis, a securing member, and means to attach said securing member to said mounting bracket.

7. A roof top carrier mounting apparatus for a vehicle roof with at least one slot into said roof, comprising, a pair of members each having a width less than the width of the slot means for causing relative movement of said members and for anchoring the members in the slot and at least one of said members having means for connecting to the roof-top carrier.

8. A roof-top carrier and vehicle roof, said roof having a central portion jointed to two side portions along longitudinal seams, the combination of, a slot formed into said roof along each seam and having sides, said slot having a smaller opening than the interior portion of said slot, a pair of mounting devices in spaced locations in each slot, each mounting device including a cotter member and base member, each cotter member of a width less than said slot opening and having a surface for engaging one said side, each base member having a first portion for extending across said slot and engaging the vehicle roof, said base member having a second portion of a width less than said slot opening and with a surface for engaging the other side of said slot means for connecting and causing relative movement of a said cotter member and said base member, said cotter and base members having interengaging surfaces for causing said members to expand laterally upon activation of said means causing relative movement of said members to engage the said sides of the slot for anchoring the members in said slot, a pair of carrier bars extending laterally across the roof top and having end pieces located at each said mounting device, and means for connecting said end pieces to said mounting devices.

9. The apparatus of claim 8 wherein mounting means are mounted in and cover said slots at all portions thereof not occupied by said mounting devices.

* * * * *